June 7, 1949.  R. E. WISSMAN  2,472,452
AIR ACTUATED CLUTCH AND BRAKE DEVICE
Filed April 9, 1945  2 Sheets-Sheet 1

INVENTOR
REUBEN E. WISSMAN
BY
Toulmin & Toulmin
ATTORNEYS

June 7, 1949. R. E. WISSMAN 2,472,452
AIR ACTUATED CLUTCH AND BRAKE DEVICE
Filed April 9, 1945 2 Sheets-Sheet 2

INVENTOR
REUBEN E. WISSMAN
BY
Toulmin & Toulmin
ATTORNEYS

Patented June 7, 1949

2,472,452

UNITED STATES PATENT OFFICE 2,472,452

AIR ACTUATED CLUTCH AND BRAKE DEVICE

Reuben E. Wissman, Minster, Ohio, assignor to The Minster Machine Company, Minster, Ohio, a corporation of Ohio Application April 9, 1945, Serial No. 587,296

10 Claims. (Cl. 192—18)

This invention relates to combination clutches and brakes that are associated with the flywheel of a mechanical press.

An object of the invention is to provide a combination brake, clutch and flywheel structure that can be mounted as a unit upon an overhanging shaft extending from the frame of a press without the necessity of the use of outboard bearings to support the outer end of the overhanging shaft.

Another object of the invention is to provide a combination brake, clutch and flywheel structure wherein the clutch is substantially contained within the flywheel to reduce the overall transverse dimension of the assembly and thereby provide a combination unit that can be mounted on an over-hanging shaft of a press without the necessity of any auxiliary support for the overhanging shaft.

Another object of the invention is to provide a structure in accordance with the foregoing objects wherein the principal bearing support for the flywheel is positioned substantially in a plane midway between opposite edges of the flywheel and immediately adjacent the clutch mechanism that is partially contained within the flywheel for thereby reducing the overall transverse dimension of the assembly.

Another object of the invention is to provide a combination brake and clutch assembly directly associated with the flywheel of a mechanical press that is sufficiently sensitive in operation that the mechanism can be used to inch the press, and will immediately stop the press in case of trouble.

Another object of the invention is to provide a combination brake and clutch for association with the flywheel of a mechanical press wherein one of the main clutch plates is also a part of the brake mechanism and is the actuating element for the clutch and the brake.

Still another object of the invention is to provide an apparatus in accordance with the foregoing object wherein the main clutch plate also comprises the actuating piston that is fluid-operated for actuating the clutch, and which is spring-urged in a direction opposite to that which produces operation of the clutch for actuating the brake.

Still another object of the invention is to provide an apparatus in accordance with the foregoing object wherein the spring means for spring-urging the clutch in one of its operating movements are substantially contained within the piston portion of the main clutch plate.

Still another object of the invention is to provide a combination brake and clutch mechanism in accordance with any of the foregoing objects wherein a single adjusting mechanism is provided for adjusting the clearance between the clutch plates and the brake plates, and a minimum of movement of the main clutch-actuating plate is thereby required for completely operating either the clutch or the brake.

Still another object of the invention is to provide an apparatus in accordance with any of the foregoing objects wherein the combination clutch and brake mechanism is fluid actuated.

Still another object of the invention wherein any or all of the aforementioned features of the combination clutch and brake mechanism are incorporated in the mechanism when in operable association with a flywheel and the entire structure is carried upon an over-hanging shaft of a press.

Further objects and advantages will become apparent from the drawings and the following description.

Figure 1:
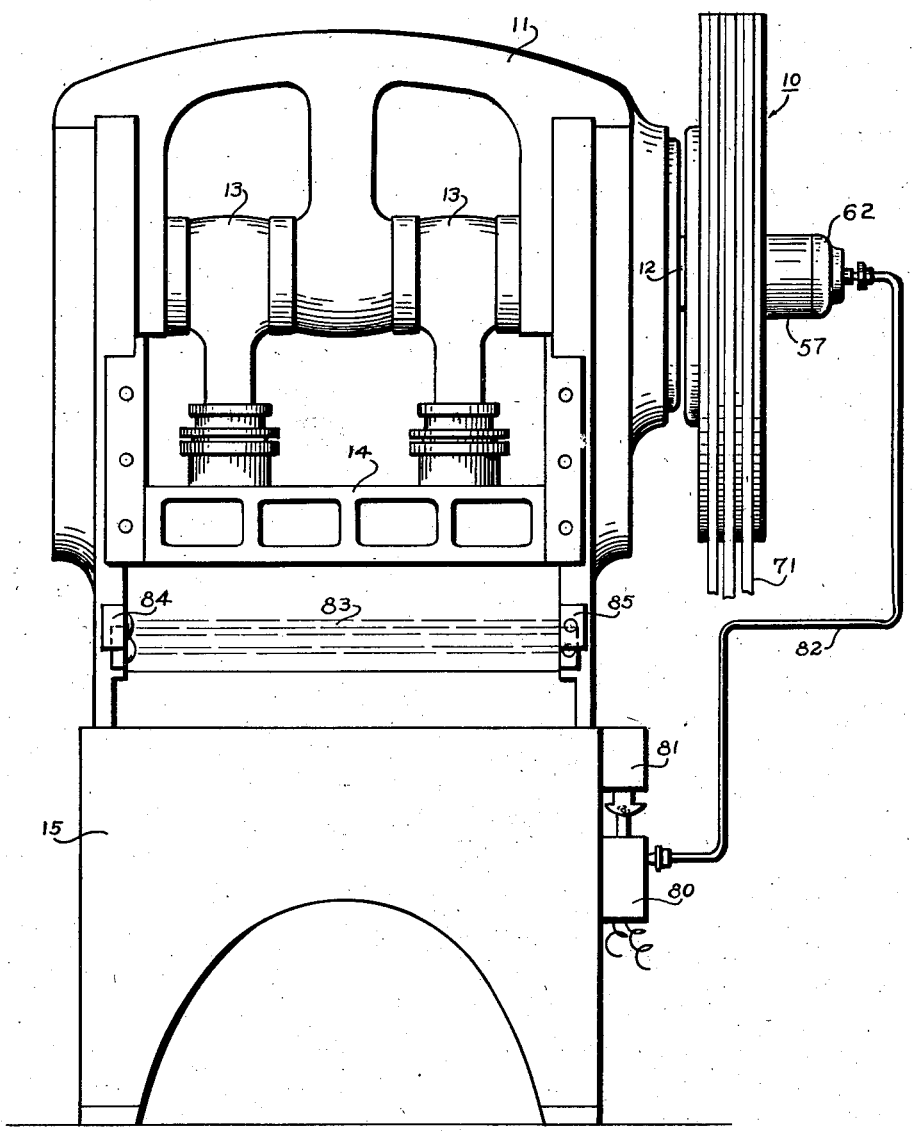
Figure 1 is an elevational view of a mechanical forming-press incorporating the apparatus of this invention.
Figure 3:
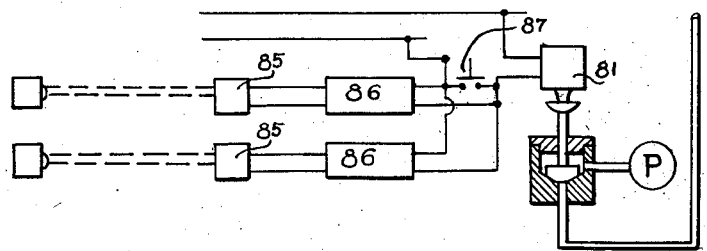
Figure 3 is a diagrammatic electrical system for controlling the operation of the brake and clutch mechanism.

In this invention, the combination brake, clutch and flywheel structure indicated generally by the reference numeral 10 is applied upon a mechanical press as illustrated in Figure 1. The mechanical press consists of a frame 11 having a crank-shaft 12 that may carry a pair of connecting rods 13 suitably mounted upon cranks on the drive-shaft 12. The connecting rods 13 are attached to a platen 14 for moving the same toward and away from the bed 15 of the press.

Figure 2:
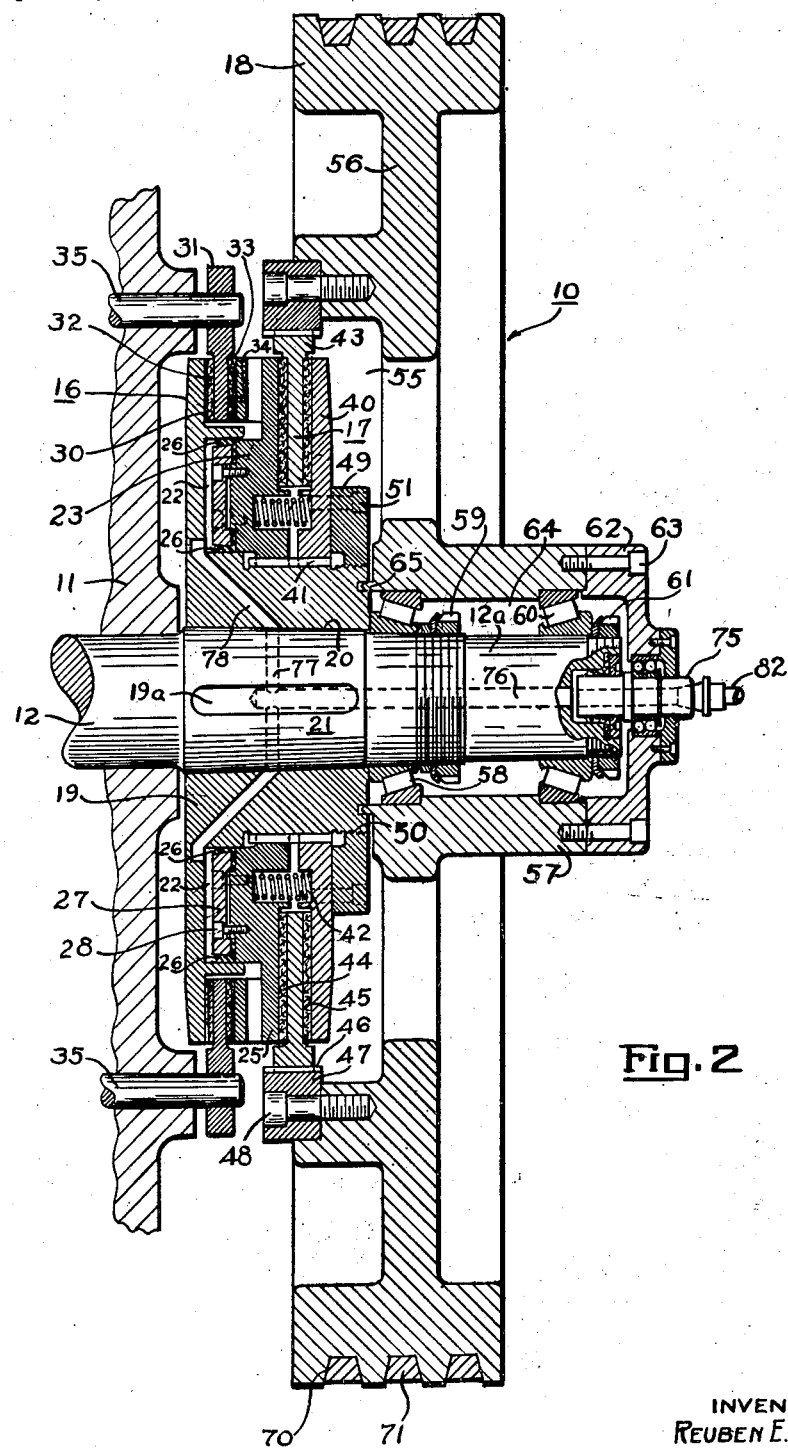
Figure 2 is a vertical cross-sectional view through the combination clutch, brake and flywheel structure of this invention.

The crank-shaft 12 of the press overhangs the frame 11 as illustrated in Figure 2, the combination clutch, brake and flywheel structure 10 being completely carried on the overhanging part 12a of the drive-shaft 12.

The over-hanging shaft 12a supports a brake mechanism 16, a clutch mechanism 17 and a flywheel 18.

The brake mechanism 16 and the clutch mechanism 17 are in general carried by a supporting sleeve member or mounting hub 19 that has a tapered inner bore 20 that is supported upon the tapered portion 21 of the over-hanging shaft 12a and is keyed thereto by the key 19a. The support member or mounting hub 19 has a radial flange on one end thereof that contains an annular recess 22 that forms the cylinder for receiving an annularly shaped piston 23 formed as an annular projection on the main actuating clutch-plate 25. The annular piston 23 is provided with cup-shaped members 26 that engage the sidewalls of the cylinder 22 for completely closing the cylinder chamber. The cup-shaped members 26 are retained in place on the annular piston 23 by means of the annular ring 27 that is held in position by the bolts 28.

The outer periphery of the radial flange on the support member or hub 19 has the annular recess 30 in which there is located the brake ring 31 that is confined between the brake-band 32 carried on brake plate formed by the radial flange on the support member 19 and the brake-band 33 carried on the actuating brake plate 34 attached to the main clutch plate 25. The brake ring 31 is carried upon and is prevented from rotation by a pair of pins 35 extending from the press frame 11, the brake ring 31 being movable axially on the pins 35 upon actuation of the brake mechanism.

The clutch mechanism 17 consists of the main clutch plate 25 and the auxiliary clutch plate 40 that are splined upon the support member 19 by means of the spline teeth 41, these clutch plates 25 and 40 forming the driven clutch elements for driving the mounting hub or support member 19 and the drive shaft 12. A plurality of compression springs 42 are positioned between the clutch plates 40 and 25, and partially contained within the annular piston 23, the clutch springs 42 tending normally to disengage the clutch mechanism and to engage the braking mechanism.

A driving clutch ring 43 is positioned between the clutch bands 44 and 45 carried by the clutch plates 25 and 40 respectively, and is supported by the spline teeth 46 provided in the clutch ring support member 47 secured to the flywheel 18 by means of the bolts 48. The clutch ring support member 47 is generally annular in shape, and a suitable number of spline teeth 46 are provided for transmitting power from the flywheel 18 to the clutch ring 43.

An annular ring 49 is threaded upon the threaded end 50 of the mounting hub or support member 19 for adjusting the plurality of clutch plates and the plurality of brake plates in their spaced relationship. Suitable bolts 51 pass through the ring 49 into threaded engagement with the clutch plate 40 to hold the ring 49 in position after suitable adjustment has been made.

The flywheel 18 is provided with an annularly-shaped recess chamber 55 which receives the major part of the clutch mechanism 17 to thereby reduce the overall transverse dimension of the flywheel and the clutch mechanism. The flywheel 18 is provided with a plate 56 positioned substantially midway between opposite edges of the flywheel, and which carries a bearing housing 57. A main tapered roller bearing 58 is positioned within the bearing housing 57 and supports the flywheel 18 upon the over-hanging shaft 12a, a suitable locking means 59 retaining the bearing 58 in position upon the over-hanging shaft 12a. It will be noted that the bearing 58 is positioned substantially midway between opposite edges of the flywheel 18, and therefore carries the principal weight of the flywheel.

A stabilizing bearing 60 of the tapered roller-bearing type is also provided within the bearing housing 57 and is positioned between the housing and the over-hanging shaft 12a. The stabilizing bearing 60 is held in position in the bearing housing 57 and on the shaft 12a by the locking member 61.

An end closure cap 62 encloses the end of the over-hanging shaft 12a and closes the bearing housing 57, the end cap 62 being secured to the bearing housing 57 by means of bolts 63. The chamber 64 provided in the bearing housing 57 is filled with lubricant for lubricating the bearings 58 and 60. A lubricant seal 65 is provided between the flywheel 18 and the member 19 to prevent loss of lubricant from the chamber 64.

The flywheel 18 may be provided with V-grooves 70 to receive drive belts 71 for driving the flywheel 18 and thus the shaft 12 through the clutch 17.

The clutch mechanism 17 is fluid-operated by means of fluid under pressure admitted into the cylinder chamber 22. Fluid is admitted into the chamber 22 through the pressure inlet connection 75 provided in the end cap 62, the fluid inlet connection 75 being suitably mounted to permit rotation of the flywheel 18 relative thereto, and communicates with a fluid passage 76 extending axially of the shaft 12a. The fluid passage 76 terminates in the radially disposed passages 77 that communicate with the passages 78 in the support member 19 that conducts the fluid under pressure into the cylinder chamber 22.

The normal position for the combination clutch and brake mechanism, when pressure below a predetermined value is not in the chamber 22, is for the brake 16 to be engaged and the clutch mechanism 17 to be disengaged. The compression springs 42 normally bring about this condition when there is no pressure in the chamber 22, or the pressure in the chamber 22 is insufficient to compress the springs 42.

When the clutch mechanism 17 is to be operated for drivingly connecting the flywheel or drive wheel 18 with the drive shaft 12, pressure will be admitted through the inlet connection 75 for transmission into the cylinder chamber 22, whereupon the piston 23 and the clutch plate 25 will be moved in a rightward direction causing disengagement of the brake mechanism 16 and engagement of the clutch mechanism 17.

The normal position of the combination clutch and brake mechanism with the brake mechanism normally engaged, provides a safety control feature whereby the press will be automatically stopped in moving the platen 14 should trouble occur. By cutting off the supply of fluid under pressure to the cylinder chamber 22, the brake mechanism will automatically be engaged and the clutch mechanism disengaged. To accomplish this function, a solenoid-actuated fluid pressure control valve 80 may be provided for controlling the supply of fluid under pressure into the inlet connection 75, the solenoid 81 being provided for operating the valve 80, which, when energized, closes the valve 80 to prevent supply of fluid under pressure through the line 82 and exhausts the fluid under pressure from the chamber 22 through this same line 82. Suitable valves for this purpose are well known.

The solenoid 81 may be operated by a light curtain 83 established across the daylight opening of the press, a suitable light source 84 being provided for establishing the light curtain 83 and a suitable selenium cell 85 being provided to respond to any disturbance in the light curtain 83.

The selenium cells 85 are connected through a suitable amplifier 86 to the solenoid 81 for energizing the solenoid in response to any interruption in the light curtain 83.

In view of the sensitivity of the operation of the combination clutch and brake mechanism of this invention, the mechanism can be used for inching the platen. For this purpose, there is provided a push-button control switch 87 that controls energization of the solenoid 81 to alternately operate the clutch and brake mechanism to inch the platen when setting dies or when doing any other work on the press.

From the foregoing description of the combination clutch, brake and flywheel mechanism, it will be apparent that the mechanisms have been constructed and arranged in a compact manner wherein the clutch mechanism is substantially enclosed within the flywheel and the fluid-operated piston for actuating the clutch and brake is substantially enclosed within the brake mechanism so that the overall transverse dimension of the assembly has been reduced to a point that it becomes practical to install the assembly as a unit upon an over-hanging shaft on a press and eliminate the use of any outboard supports for the drive shaft for the purpose of carrying the weight of the assembly. It will also be noted that the assembly of the flywheel, the clutch and the brake is such that all of the mechanism can be assembled readily from the extending end of the over-hanging shaft 12a, and that the flywheel or drive wheel 18 can readily be removed from the over-hanging shaft 12a for necessary inspection and repair of the clutch and brake mechanisms.

While the apparatus disclosed and described herein constitutes a preferred form of the invention, yet it will be understood that the apparatus is capable of mechanical alteration without departing from the spirit of the invention, and that all modifications that fall within the scope of the appended claims are intended to be included herein.

Having thus fully described my invention, what I claim as new and desire to secure by Letters Patent is:

1. In the combination of a press having a drive shaft overhanging the press frame unsupported on the outward end thereof carrying a flywheel thereon and a combination brake and clutch on the drive shaft between the press frame and the flywheel, a brake plate carried on said shaft and disposed closely adjacent the frame of the press, a single brake ring adjacent said brake plate and supported by the frame of the press, a clutch plate supported by said shaft, a single clutch ring adjacent said clutch plate and carried by the flywheel of the press, a disc-type common actuating member carried by said shaft between said rings for alternate engagement of either thereof, fluid operated means carried by said brake plate in substantial radial alignment with said brake ring and connected with said actuating member to engage the clutch, and spring means between said clutch plate and said actuating member within the inner periphery of said clutch ring and between the radial planes of said rings for disengaging the clutch and engaging the brake.

2. In the combination of a press having a drive shaft overhanging the press frame unsupported on the outward end thereof carrying a flywheel thereon and a combination brake and clutch on the drive shaft between the press frame and the flywheel, a brake plate carried on said shaft and disposed closely adjacent the frame of the press, a single brake ring adjacent said brake plate and supported by the frame of the press, a clutch plate supported by said shaft, a single clutch ring adjacent said clutch plate and carried by the flywheel of the press, a disc-type common actuating member carried by said shaft between said rings for alternate engagement of either thereof, fluid operated means carried by said brake plate in substantial radial alignment with said brake ring and connected with said actuating member to engage the clutch, and spring means between said clutch plate and said actuating member within the inner periphery of said clutch ring and between the radial planes of said rings for disengaging the clutch and engaging the brake, said clutch ring and clutch plate being substantially contained within the flywheel of the press.

3. In the combination of a press having a drive shaft overhanging the press frame unsupported on the outward end thereof carrying a flywheel thereon and a combination brake and clutch on the drive shaft between the press frame and the flywheel, a brake plate carried on said shaft and disposed closely adjacent the frame of the press, a single brake ring adjacent said brake plate and supported by the frame of the press, a clutch plate supported by said shaft, a single clutch ring adjacent said clutch plate and carried by the flywheel of the press, a disc-type common actuating member carried by said shaft between said rings for alternate engagement of either thereof, fluid operated means carried by said brake plate in substantial radial alignment with said brake ring and connected with said actuating member to engage the clutch, spring means between said clutch plate and said actuating member within the inner periphery of said clutch ring and between the radial planes of said rings for disengaging the clutch and engaging the brake, and an adjusting member engaging said clutch plate on the outward side thereof relative to the frame of the press to adjust the operating clearance of the clutch and brake simultaneously.

4. In the combination of a press having a drive shaft overhanging the press frame unsupported on the outward end thereof carrying a flywheel thereon and a combination brake and clutch on the drive shaft between the press frame and the flywheel, a brake plate carried on said shaft and disposed closely adjacent the frame of the press, a single brake ring adjacent said brake plate and supported by the frame of the press, a clutch plate supported by said shaft, a single clutch ring adjacent said clutch plate and carried by the flywheel of the press, a disc-type common actuating member carried by said shaft between said rings for alternate engagement of either thereof and including an annular ring forming a piston operating within an annular recess in said brake plate in substantial radial alignment with said brake ring for operating said actuating member to engage the clutch, means for supplying fluid under pressure into said recess for operating said piston, and spring means between said clutch plate and said actuating member within the inner periphery of said clutch ring and between the radial planes of said rings for disengaging the clutch and engaging the brake.

5. A combination clutch and brake unit for disposition upon the drive shaft of a press between the press frame and a flywheel on the drive shaft with the brake disposed adjacent the press frame and the clutch disposed adjacent the flywheel that includes, a hub sleeve member having an axial opening therein for mounting of the hub upon a drive shaft and having a radial flange at one end thereof forming a brake plate, brake ring means adjacent the outer portion of said brake plate for cooperation therewith and adapted for connection to a stationary part of a press, a plurality of clutch plates partly carried by said sleeve at the opposite end thereof and rotatable therewith and partly adapted for connection to a press flywheel, one of said clutch plates mounted on said sleeve forming a common actuating member between said clutch plates and said brake ring means, fluid actuated means carried by said sleeve and said brake plate and connected with said common actuating member for engaging the clutch plates, and spring means between the clutch plate carried on said sleeve and said common actuating member at least partially positioned within the radial plane of the clutch plates for releasing the clutch plates and engaging the brake plate.

6. A combination clutch and brake unit for disposition upon the drive shaft of a press between the press frame and a flywheel on the drive shaft with the brake disposed adjacent the press frame and the clutch disposed adjacent the flywheel that includes, a sleeve member having an axial opening therein for mounting thereof on a press drive shaft, a plurality of braking plates partly carried on said sleeve for rotation therewith and partly adapted for connection to the frame of a press, a plurality of clutch plates partly carried on said sleeve for rotation therewith and partly adapted for connection to a flywheel carried on the drive shaft of a press, one of said brake plates and one of said clutch plates forming a common actuating member between the brake and the clutch, fluid actuated means in substantial radial alignment with said brake plates and connected with said common actuating member for engaging said clutch plates, and spring means between the clutch plates and said common actuating member in substantial radial alignment with said clutch plates for releasing the clutch plates and engaging the brake plates.

7. A combination clutch and brake unit for disposition upon the drive shaft of a press between the press frame and a flywheel on the drive shaft with the brake disposed adjacent the press frame and the clutch disposed adjacent the flywheel that includes, a sleeve member having an axial opening therein for mounting thereof on a press drive shaft, a plurality of braking plates partly carried on said sleeve for rotation therewith and partly adapted for connection to the frame of a press, a plurality of clutch plates partly carried on said sleeve for rotation therewith and partly adapted for connection to a flywheel carried on the drive shaft of a press, one of said brake plates and one of said clutch plates forming a common actuating member between the brake and the clutch, an annular fluid actuated member in substantial radial alignment with said brake plates and connected with said common actuating member for engaging said clutch plates, and spring means between the clutch plates and said common actuating member in substantial radial alignment with said clutch plates for releasing the clutch plates and engaging the brake plates.

8. A combination clutch and brake unit for disposition upon the drive shaft of a press between the press frame and a flywheel on the drive shaft with the brake disposed adjacent the press frame and the clutch disposed adjacent the flywheel that includes, a mounting hub, a brake plate carried on said hub at one end thereof rotatable therewith, a clutch plate carried on said hub at the opposite end thereof and rotatable therewith, a brake ring and a clutch ring positioned between said plates and cooperating respectively with the brake plate and the clutch plate, said clutch ring and said brake ring being adapted for connection respectively to a flywheel on the drive shaft of the press and the press frame, a common actuating member carried by said hub rotatable therewith and positioned between said rings, fluid operated means positioned in said brake plate in substantial radial alignment with said brake ring and connected with said common actuating member for engaging the clutch, and spring means between said clutch plate and said common actuating member within the inner periphery of said clutch ring and between the radial planes of said rings for disengaging the clutch and engaging the brake.

9. A combination clutch and brake unit for disposition upon the drive shaft of a press between the press frame and a flywheel on the drive shaft with the brake disposed adjacent the press frame and the clutch disposed adjacent the flywheel that includes, a mounting hub, a brake plate carried on said hub at one end thereof rotatable therewith, a clutch plate carried on said hub at the opposite end thereof and rotatable therewith, a brake ring and a clutch ring positioned between said plates and cooperating respectively with the brake plate and the clutch plate, said clutch ring and said brake ring being adapted for connection respectively to a flywheel on the drive shaft of the press and the press frame, a common actuating member carried by said hub rotatable therewith and positioned between said rings, an annular fluid operated piston positioned in an annular recess in said brake plate positioned around said hub in substantial radial alignment with said brake ring and connected with said common actuating member for engaging the clutch, spring means between said clutch plate and said actuating member within the inner periphery of said clutch ring and substantially between the radial planes of said clutch and brake rings for disengaging the clutch and engaging the brake, and an adjusting member carried on said hub engaging said clutch plate to move the same relative to the brake plate to adjust the operating clearance for the clutch and brake simultaneously.

10. A combination clutch and brake unit for disposition upon the drive shaft of a press between the press frame and a flywheel on the drive shaft with the brake disposed adjacent the press frame and the clutch disposed adjacent the flywheel that includes, a brake plate for positioning adjacent the press frame and having an axially extending mounting hub integral therewith to extend outwardly from the frame of the press, a clutch plate carried on said hub at the outward end thereof and rotatable therewith, a brake ring and a clutch ring positioned between said plates and cooperating respectively with the brake plate and the clutch plate, said clutch ring and said brake ring being adapted for connection respectively to a flywheel on the drive shaft of the press and the press frame, a common actuating member carried by said hub rotatable therewith and positioned between said rings, fluid operated means positioned in said brake plate in substantial radial alignment with said brake ring and connected with said common actuating member for engaging the clutch, and spring means between said clutch plate and said common actuating member within the inner periphery of said clutch ring and between the radial planes of said rings for disengaging the clutch and engaging the brake.

REUBEN E. WISSMAN.

REFERENCES CITED

The following references are of record in the file of this patent:

UNITED STATES PATENTS

| Number | Name | Date |
| --- | --- | --- |
| 1,474,112 | Groene | Nov. 13, 1923 |
| 2,009,301 | Rode et al. | July 23, 1935 |
| 2,014,683 | Hubert | Sept. 17, 1935 |
| 2,089,733 | Criley | Aug. 10, 17937 |
| 2,159,326 | Harwood et al. | May 23, 1939 |
| 2,180,218 | Wissman | Nov. 14, 1939 |
| 2,242,396 | Johansen | May 20, 1941 |

FOREIGN PATENTS

| Number | Country | Date |
| --- | --- | --- |
| 525,124 | Great Britain | Aug. 22, 1940 |